March 9, 1971 KOHEI MASUDA ET AL 3,568,252
ANNULAR COOLING DEVICE FOR MANUFACTURE OF TUBULAR FILM
Filed March 6, 1968 2 Sheets-Sheet 1

United States Patent Office 3,568,252
Patented Mar. 9, 1971

3,568,252
ANNULAR COOLING DEVICE FOR MANUFACTURE OF TUBULAR FILM
Kohei Masuda, Kazumasa Hasegawa, and Akio Okamoto, Yokkaichi-shi, Japan, assignors to Mitsubishi Petrochemical Co., Ltd.
Filed Mar. 6, 1968, Ser. No. 711,121
Claims priority, application Japan, Mar. 15, 1967, 42/16,180; Sept. 11, 1967, 42/58,289
Int. Cl. B29d 23/04
U.S. Cl. 18—14                                  2 Claims

ABSTRACT OF THE DISCLOSURE

In the manufacture of a film of a thermoplastic resin according to an inflation method, the improvement which comprises extruding a molten resin from an annular die, cooling preliminarily thus extruded resin with a gaseous coolant to not lower than the softening point of said resin, inflating preliminarily thus cooled resin by air having reduced pressure, cooling thus inflated resin with a gaseous coolant rapidly to below the softening point of said resin while further inflating the same to a predetermined dimension by a gaseous medium sealed in the resulting tubular film of said resin and fixing the dimension of the resulting tubular film at the predetermined point. There is also disclosed an annular cooling device employed in the manufacture of the tubular film.

BACKGROUND OF THE INVENTION

(1) Field of the invention

This invention relates to a method of manufacturing a tubular film from thermoplastic resins and a device used therefor.

(2) Description of the prior art

In a conventional inflation method of manufacturing a film known heretofore, the film of thermoplastic resins is obtained by inflating a molten resin extruded from an annular die to a predetermined dimension in one step on a predetermined position of the annular die by a pressurized gaseous coolant sealed in the resulting tubular film, and, simultaneously, fixing the dimension of the resulting tubular film by cooling rapidly with a gaseous coolant blown from a conventional annular cooling ring.

The conventional method mentioned above has disadvantages in that thermal and mechanical stresses exerted on the resin at the time of melting and kneading the same in the extruder and annular die remain in the resulting film without being relaxed sufficiently due to the rapid cooling, and that the molecular orientation in the resin is enhanced by the rapid inflation and simultaneous extension thereof. As a result, the qualities of films manufactured according to the conventional method, for example, the optical properties such as transparency, gloss, etc., are drastically deteriorated.

Moreover, in the conventional method, various difficulties are encountered in winding up the resulting film and in the subsequent processing of the same such as bag-making, printing, etc., due to shrinkage of the film which stems from the fact that molecules of the resin are subjected to a remarkable orientation during the tubing process.

On the other hand, a film having excellent optical properties may be manufactured by inflating the resin while cooling rapidly according to the conventional technique but at a position sufficiently apart from the annular die, because, by so doing, the thermal and mechanical stresses exerted on the molten resin are sufficiently relaxed. However, in this instance, it takes a long period of time until the molten resin extruded from the annular die is rapidly cooled, thus, molecules of the molten resin are preferentially and sufficiently oriented in the direction toward which the resulting film is taken up. As a result, mechanical properties of the resulting film become directional, showing extreme non-uniformity in longitudinal and transversal directions. There are other accompanying disadvantages in that the resulting tubular film flattened by a pair of pinch rollers tends to lack slipperiness and be blocked due to insufficient cooling resulting from the location of cooling point near these pinch rollers, and that the operational stability is disturbed by trembling of the molten resin due to fluctuating atmosphere, giving rise to wrinkling and uneven thickness of the resulting film.

In addition, when manufacturing the tubular film in a high speed according to the convention methods known heretofore, the qualities of the product film as well as the processing stability tend to be even degraded, thus, films having satisfactory qualities for practical use may not be obtained.

SUMMARY OF THE INVENTION

An object of this invention is to provide a method of manufacturing a tubular film having excellent optical properties such as transparency, gloss, etc., from thermoplastic resins.

Another object of this invention is to provide a method of manufacturing a tubular film having excellent impact strength and tensile strength as well as an excellent dynamic property of less directionality from thermoplastic resins.

Still another object of this invention is to provide a method of manufacturing a tubular film freed from inconveniences encountered in winding and subsequent processing steps due to shrinkage from thermoplastic resins.

Further, another object of this invention is to provide a method of manufacturing a tubular film stably and in a high speed from thermoplastic resins.

Yet another object of this invention is to provide an annular cooling device used for accomplishing these objects of this invention enumerated above.

We have found that in the manufacture of a tubular film of thermoplastic resins such as high or low density polyethylene, polypropylene, polyvinyl chloride, polystyrene, polyamide, polyesters and the like according to inflation method, there may be obtained a tubular film having excellent optical properties such as transparency and gloss, and mechanical properties such as impact strength and tensile strength, as well as an excellent dynamic property of less directionality, and free from shrinkage in winding and subsequent processing steps, by cooling a molten resin extruded from an annular die in two steps and inflating the resin in two steps.

That is, in accordance with this invention, there is provided an improved method of manufacturing a film of thermoplastic resins by inflating the resin and cooling thus inflated resin with a gaseous coolant blown out from an annular cooling device.

More particularly, the method comprises preliminarily cooling a molten resin extruded from an annular die with a gaseous coolant to a softening point of said resin measured according to Vicat Method (ASTM D–1525), or higher than that, preliminarily inflating and extending the resin by air of reduced pressure surrounding the film, cooling said resin subsequently with a gaseous coolant rapidly below the said softening point of said resin while further inflating the same to a predetermined dimension by a gaseous medium sealed in a tubular film of said resin and fixing the dimension of the resulting tubular film.

In the method of this invention, the temperature of the preliminary cooling referred to above is normally from the softening point as determined according to the Vicat Method to a temperature higher than the softening point by 60° C., preferably 30° C. For example, when using a low density polyethylene produced by high pressure method as a material, the temperature between the softening temperature and about 100° C., is preferable.

We have also found that in an annular cooling device employed in the method of this invention, a reduced pressure suitable for causing the 1st step inflation, i.e. the preliminary inflation, may be obtained from a suction created by the blowing of the gaseous coolant for the 2nd step cooling, i.e. final cooling, if a slit for blowing the gaseous coolant for the 1st step cooling, i.e. the preliminary cooling, is arranged at such an angle that the gaseous coolant may be blown against the tubular film running upwards in a horizontal direction to no more than 30° of angle of elevation while a slit for blowing the gaseous coolant for the 2nd step cooling, i.e. final cooling, is arranged at such an angle that the gaseous coolant may be blown against the running tubular film in a parallel direction with respect to the running direction thereof to no more than 30° of inclination towards the axis of the tubular film.

Thus, by so constructing the cooling device according to this invention, there is no need for any mechanical means such as vacuum pump suction for reducing pressure in an inflating chamber in which the tubular film is housed.

Moreover, if the inflating chamber mentioned above is provided with a plurality of air-inlet tubes having valve means and thus furnishing through-passages between open air and the inflating chamber, the degrees of reduced pressure at respective portions of periphery of the tubular film may be optionally controlled by adjusting the amounts of air passing through the air-inlet tubes by way of the valve means to control the inflating condition optionally thereby preventing uneven thickness of the resulting tubular film.

Thus, in accordance with this invention, there is provided an annular cooling device for the manufacture of tubular film of thermoplastic resins in an inflation method comprising a coolant chamber provided with slits for blowing a gaseous coolant for preliminary cooling against a tubular film in a horizontal direction to not more than 30° of angle of elevation, an inflating chamber for preliminarily inflating the tubular film thus preliminarily cooled, if desired, said inflating chamber being provided with a plurality of gas-inlet tubes having valve means, and a coolant chamber provided with slits for blowing a gaseous coolant for final cooling against the preliminarily inflated tubular film in a parallel direction with respect to the running direction of the tubular film to no more than 30° of inclination towards the axis of the tubular film.

In the annular cooling device of this invention, the reason for limiting the angle of slit for blowing gaseous coolant for preliminary cooling as set forth above is that with the angle of depression, i.e., below the horizontal direction, the gaseous coolant is blown opposite to the running direction of the tubular film causing turbulences which shake the tubular film and lead to uneven thickness of the resulting film, while with the angle of elevation of more than 30°, it becomes difficult to maintain the reduced pressure of the inflation chamber.

Likewise, the reason for limiting the angle of slit for blowing gaseous coolant for final cooling as set forth above is that with the angle of inclination outside the parallel direction with respect to the running direction of the tubular film, the cooling effect may not be expected, while the angle of inclination of more than 30° towards the axis of the tubular film reduces the suction effect and the reduced pressure necessary for the inflating chamber may not be obtained.

In the device of this invention, normally, aperture of slit is preferably 2–6 mm., and the ratio of inner diameter of the preliminary coolant chamber, i.e. a cooling ring, to that of final coolant chamber, i.e. a cooling ring, is preferably 1:1.1–2.0.

BRIEF DESCRIPTION OF THE DRAWINGS

This invention will be better understood from the following description taken in connection with the accompanying drawings in which.

Figure 1:
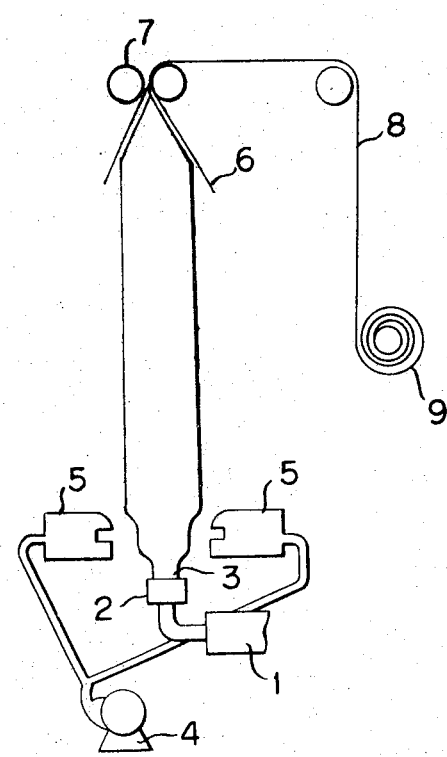
FIG. 1 is a schematic diagram illustrating the manufacturing of a tubular film of thermoplastic resins using the device of this invention.

Now, an embodiment of the manufacturing of a tubular film using the device of this invention will be explained in the following by making references to the drawings:

As illustrated in FIG. 1, a tubular film is manufactured by heating, melting and kneading thermoplastic resins in a conventional extruder 1, extruding the molten resin continuously from an annular die 2, cooling thus extruded resin 3 with a gaseous coolant blown from a cooling device 5 placed at a predetermined position over the annular die 2 and connected with a blower 4, inflating the resin 3 with a pressurized gaseous medium until it reaches to a predetermined dimension, flattening the thus inflated resin by a pair of nip rolls 7 via a guide plate 6, and winding up the resulting flattened tubular film 8 onto a winder 9.

Figure 2:
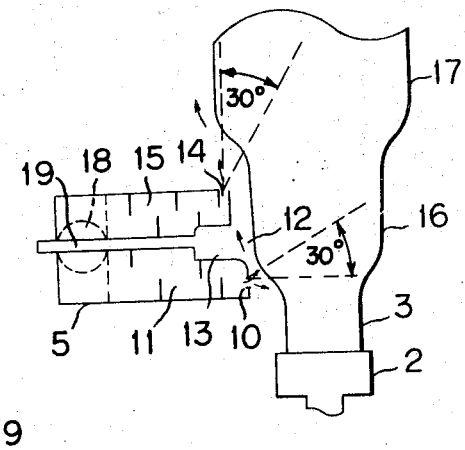
FIGS. 2 and 3 show working conditions of the device of this invention.

Referring to the FIG. 2, the cooling device 5, for example, integrally comprises a feed pipe 18, a coolant chamber 11 for preliminary cooling provided with slits 10, a coolant chamber 15 for final cooling provided with slits 14, and an inflating chamber 13 which is maintained at a reduced pressure by suction created by blowing a gaseous coolant 12 from the slits 14 at a high speed in a parallel direction with respect to the running direction of the preliminarily cooled tubular film along the outer surface thereof.

The molten resin 3 extruded from the annular die 2 is preliminarily cooled with the gaseous coolant blown horizontally from slits 10 of the coolant chamber 11 down to near the softening temperature of the resin, then, subsequently, the tubular body of the resin 3 is preliminarily inflated and extended in the inflating chamber being maintained at a reduced pressure of about 2–3 mm. to 10–20 mm. of water up to a predetermined degree of inflation which is normally 2–5 times.

The preliminarily inflated resin 16 is then cooled rapidly with the gaseous coolant blown from slits 14 of the coolant chamber 15 down below the softening point of the resin, while, simultaneously, the preliminarily inflated resin 16 is further inflated under atmospheric pressure by a pressurized gaseous medium sealed therein up to a predetermined dimension at which the tubular film 17 is fixed.

FIG. 2 indicates the range of angles at which gaseous coolant may be blown in accordance with the present invention.

Figure 3:
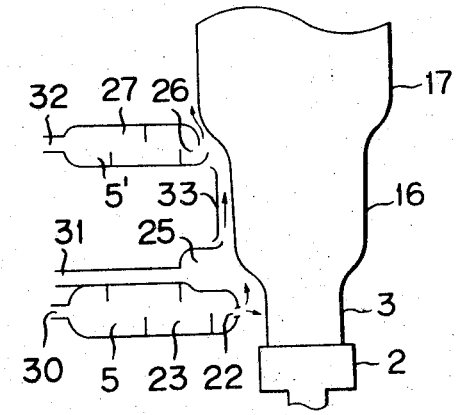

FIG. 3 illustrates another embodiment of the annular cooling device according to this invention in which the molten resin 3 extruded from the annular die 2 is led to a preliminary cooling ring 5 which comprises a coolant chamber 23 for preliminary cooling provided with blowing slits 22 and an inflating chamber 25 provided with tubes 31, where the extruded resin is preliminarily cooled with the gaseous coolant blown at a small angle of elevation from the slits 22 down to near the softening temperature of the resin. Subsequently, the preliminarily cooled resin is preliminarily inflated and extended up to a predetermined degree of inflation which is normally 2–5 times, in an inflating chamber 25 maintained at a reduced pressure of about 2–3 mm. to 10–20 mm. of water by suction created by a high speed stream of the gaseous coolant blown at a small angle relative to the running direction of the resin from slits 26 of a cooling ring 5' for final cooling.

The resin 16 thus preliminarily cooled and inflated is passed through a ring 33 for preventing heat radiation which is disposed between the cooling ring 5 for preliminary cooling and the cooling ring 5' for final cooling, then, cooled rapidly in a coolant chamber 27 for final cooling having blowing slits 26 down to below the softening temperature, while, simultaneously, inflated under atmospheric pressure by a gaseous medium sealed in the resin 16 up to a predetermined dimension at which the tubular film 17 is fixed.

Figure 4:
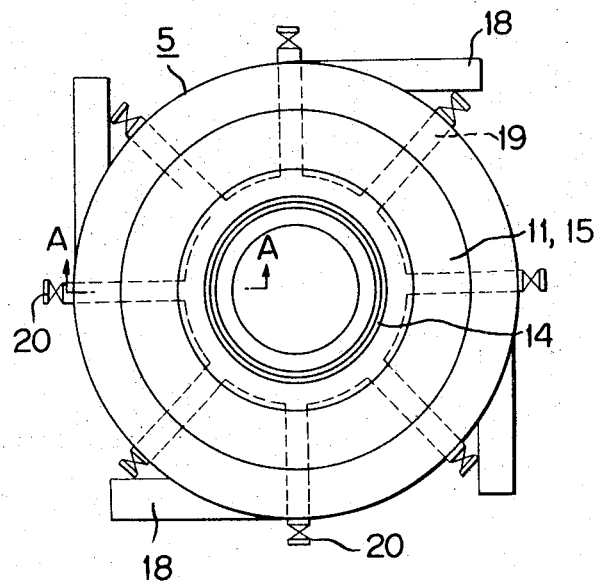
FIG. 4 is a plan view of the device shown in FIG. 2.
Figure 5:
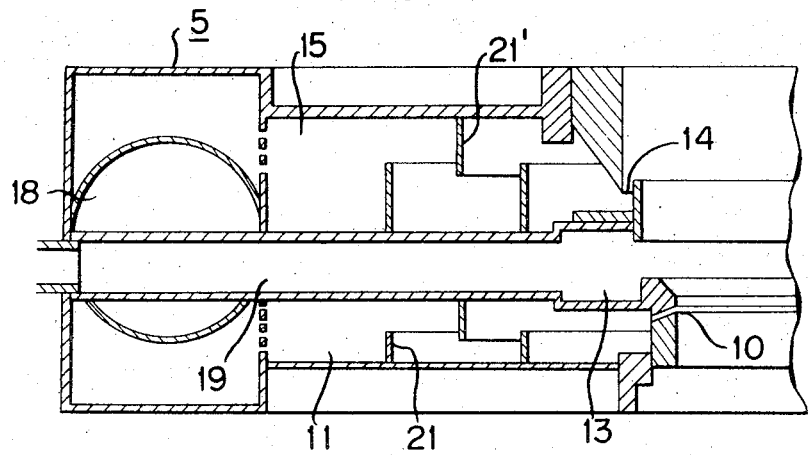
FIG. 5 is a sectional view of FIG. 4 at line A—A.

FIGS. 4 and 5 illustrate an embodiment of the cooling device according to this invention in which FIG. 4 is a plan view thereof and FIG. 5 is a sectional view of FIG. 4 at line A—A.

In the instant embodiment, a part of air fed from a gaseous coolant feed pipe 18 is introduced to a coolant chamber 11 for preliminary cooling, if desired, provided with turbulent plates 21, and blown out from slits 10. The remainder of air is introduced to a coolant chamber 15 for final cooling, if desired, provided with turbulent plates 21, and blown out from slits 14. Between the coolant chambers 11 and 15, there is an inflating chamber 13 provided with a plurality of air-inlet tubes 19 having valve means 20.

DESCRIPTION OF THE PREFERRED EMBODIMENTS

This invention will be explained more fully and practically in the following examples.

It should not be construed, however, that these examples restrict this invention as they are given merely by way of illustration.

EXAMPLE 1

The qualities of films manufactured under the following conditions according to the present invention and the prior art methods were compared with each other:

Manufacturing conditions

Material resin—High-pressure polyethylene (Yukalon YK–50, trade name, product of Mitsubishi Petrochemical Co., Ltd.), Melt index–4.0, Density—0.9240
Extruder diameter—65 mmφ
Screw:
   L/D—22
   Compression ratio—3.3
   Type—Long metering type.
Annular die diameter—100 mmφ

Cooling ring:
   Present invention—As shown in FIG. 2.
   Prior art—For conventional one-step cooling.
Processing temperature—150° C.
Screw speed—40 r.p.m.
Extrusion rate—20 kg./h.
Tube-up speed—40 m./min.
Film size:
   Thickness—0.02 mm.
   Width—200 mm.
Blow-up ratio—Approx. 1.3

The results are shown in the following Table 1:

TABLE 1

| | Present invention | Prior art 1 | Prior art 2 |
|---|---|---|---|
| Height of frost line (mm.) | 230 | 150 | 400 |
| Film cooling temperature (° C.): | | | |
|   Preliminary | 100 | ------ | ------ |
|   Final | 60 | 80 | 80 |
| Qualities of film: | | | |
|   Gloss (0/00) | 98 | 75 | 98 |
|   Haze (percent) [2] | 8.0 | 10.5 | 8.0 |
|   Blocking degree (g.) [3] | 150 | 250 | 500 |
|   Tear strength (kg./cm.) [4]: | | | |
|     MD | 180 | 180 | 180 |
|     TD | 125 | 130 | 150 |
|   Sand-bag drop, impact strength (cm.) [5] | 35 | 25 | 10 |
|   Thermal shrinkage (percent) [6]: | | | |
|     MD | >1–2 | 3–4 | 4–5 |
|     TD | >1 | 2 | >1 |

[1] JIS Z-8741-61.
[2] ASTM D-1003-61.
[3] According to Mitsubishi method in which an energy required to open up the flattened tubular film pressed with a load of 20 kg./2cm.² at 20° C. for 10 minutes is measured in terms of gram.
[4] JIS Z-1702-59.
[5] CS-227-59 (American Commercial Standard).
[6] According to Mitsubishi method in which shrinkage is measured after being kept in an oil bath at 100° C. for 10 minutes.

As can be noted from Table 1, when a tubular film of a thermoplastic resin is manufactured according to the conventional inflation method as in "Prior art 1," the optical properties such as gloss and transparency are poor and it tends to shrink causing various inconveniences in the winding operation and in the subsequent processing such as bag-making, printing, etc.

Although the optical properties such as luster and haze are improved in the conventional inflation method if the rapid cooling is effected at a point sufficiently apart from the annular die as in "Prior art 2" shown in Table 1, the openability is degraded due to insufficient cooling and the directionality in the strength also becomes apparent.

In contradistinction, as can be clearly noted from Table 1, the tubular film obtained according to this invention has excellent optical properties such as gloss and transparency, blocking as well as superior impact strength, directionality and shrinking property over those of tubular films obtained according to the prior art methods.

EXAMPLE 2

The instant example illustrates the comparison between the method of this invention and that of prior art with respect to manufacturing of tubular film at a high speed.

Material resin—High-pressure polyethylene (Yukalon YK–50, trade name, product of Mitsubishi Petrochemical Co., Ltd.,), Melt index—4.0, Density—0.9250
Extruder diameter—65 mmφ
Screw dimension:
   L/D—22
   Compression ratio—3.3
   Type—Long metering type.
Annular dies diameter—100 mmφ
Cooling ring:
   Present invention—As shown in FIG. 2.
   Prior art—For conventional one-step cooling.

The results are shown in the following Table 2:

TABLE 2

| | Present invention | | Prior art | | |
|---|---|---|---|---|---|
| Film dimension (mm.): | | | | | |
|   Thickness | 0.02 | 0.04 | 0.012–0.3 | 0.02 | 0.012–0.3 |
|   Width | 250 | 250 | 50–550 | 250 | 50–550 |
| Processing temperature (°C.) | 150 | 150 | 150 | 150 | 150 |
| Height of frost line (mm.) | 230 | 230 | 200–250 | 150 | 150–200 |
| Blow-up ratio | 1.6 | 1.6 | 0.5–3.5 | 1.6 | 0.5–3.5 |
| Screw speed (r.p.m.) | 110 | 110 | 10–110 | 42 | 10–42 |
| Extrusion rate (kg./h.) | 54 | 54 | 5–54 | 21.6 | 5–21.6 |
| Tube-up speed (m./min.) | 100 | 50 | 10–100 | 40 | 10–40 |

As can be noted from Table 2, the prior art method is only capable of manufacturing the film having 0.02 mm. thickness at a rate of about 40 m. per minute, or, at an extrusion rate of 22 kg. per hour, at the most, due to the poor cooling efficiency.

In contrast, the method of this invention is capable of manufacturing the film having 0.02 mm. thickness at a rate of about 100 m. per minute, or, at an extrusion rate of 54 kg. per hour, without experiencing operational instabilities such as zigzagging and fluctuation in width of the flattened tubular film, and free from shrinkage and gauge instability.

We claim:

1. An annular cooling device for the manufacture of tubular film of thermoplastic resins according to an inflation method comprising a coolant chamber provided with slits for blowing a gaseous coolant for preliminary cooling against a tubular film in a horizontal direction to no more than 30° of angle of elevation, means defining an inflating chamber for preliminarily inflating the tubular film thus preliminarily cooled and a coolant chamber provided with slits for blowing a gaseous coolant for final cooling against the preliminarily inflated tubular film in a parallel direction with respect to the running direction of the tubular film to no more than 30° of inclination towards axis of the tubular film, said inflating chamber being interposed between said two coolant chambers and suction being created in said inflating chamber by said blown final cooling coolant.

2. An annular cooling device for the manufacture of tubular film of thermoplastic resins according to an inflation method comprising a coolant chamber provided with slits for blowing a gaseous coolant for preliminary cooling against a tubular film in a horizontal direction to no more than 30° of angle of elevation, means defining an inflating chamber for preliminarily inflating the tubular film thus preliminarily cooled provided with a plurality of gas-inlet tubes having valve means, and a coolant chamber provided with slits for blowing a gaseous coolant for final cooling against the preliminarily inflated tubular film in a parallel direction with respect to the running direction of the tubular film to no more than 30° of inclination towards axis of the tubular film, said inflating chamber being interposed between said two coolant chambers and suction being created in said inflating chamber by said blown final cooling coolant.

References Cited
UNITED STATES PATENTS

| | | | |
|---|---|---|---|
| 3,221,370 | 12/1965 | Corbett | 18—14 |
| 3,280,429 | 10/1966 | Haley | 18—14 |
| 3,313,870 | 4/1967 | Yazawa | 18—14X |
| 3,363,035 | 1/1968 | Niho et al. | 18—14X |

ANDREW R. JUHASZ, Primary Examiner

U.S. Cl. X.R.

264—95

UNITED STATES PATENT OFFICE
CERTIFICATE OF CORRECTION

Patent No. 3,568,252     Dated March 9, 1971

Inventor(s) KOHEI MASUDA et al

It is certified that error appears in the above-identified patent and that said Letters Patent are hereby corrected as shown below:

Column 6, Table 1 - final 2 lines - the values

"$>1\text{-}2$" and "$>1$" (2 occurrences) should be

"$1\text{-}2>$" and "$1>$".

Signed and sealed this 27th day of March 1973.

(SEAL)
Attest:

EDWARD M. FLETCHER, JR.
Attesting Officer

ROBERT GOTTSCHALK
Commissioner of Pate